Figure 7:
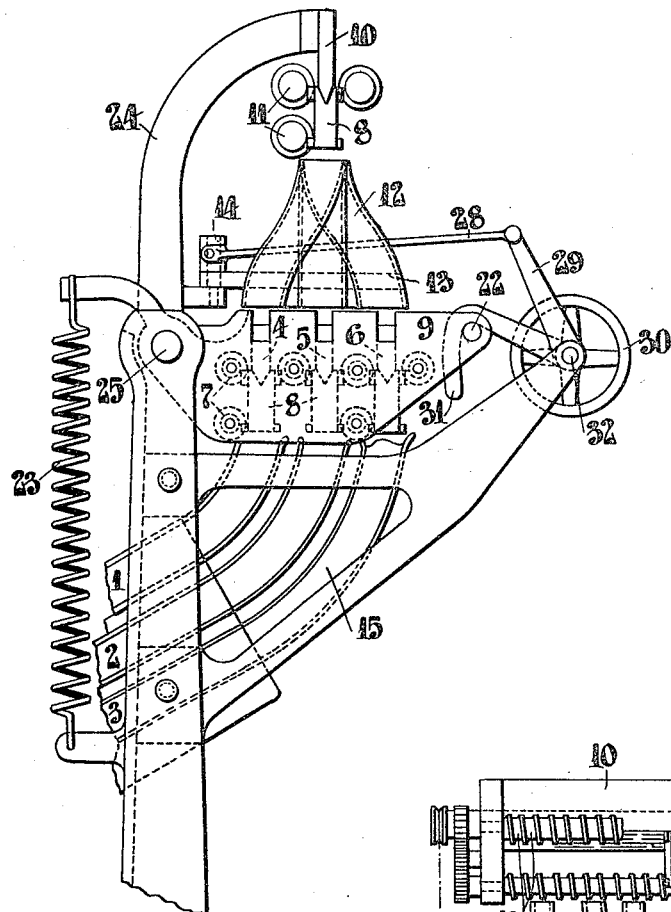

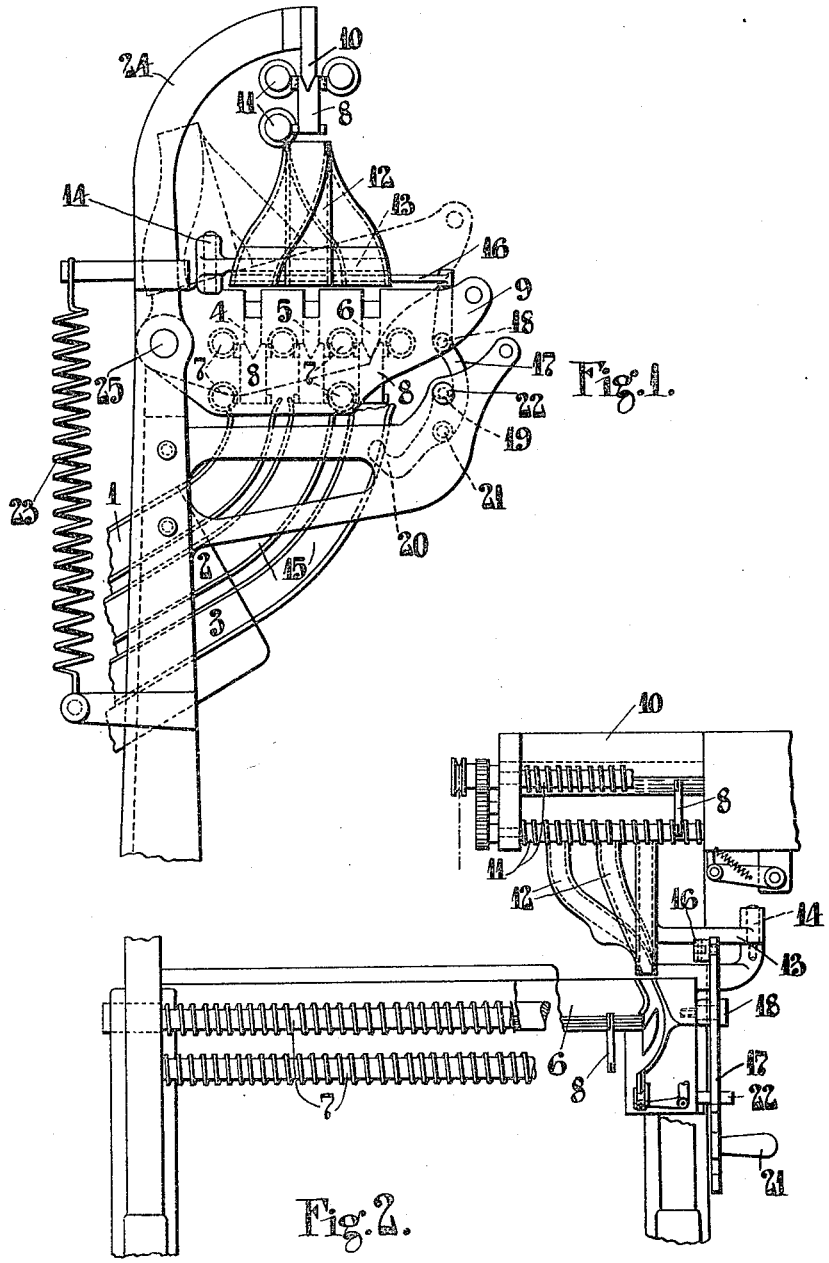

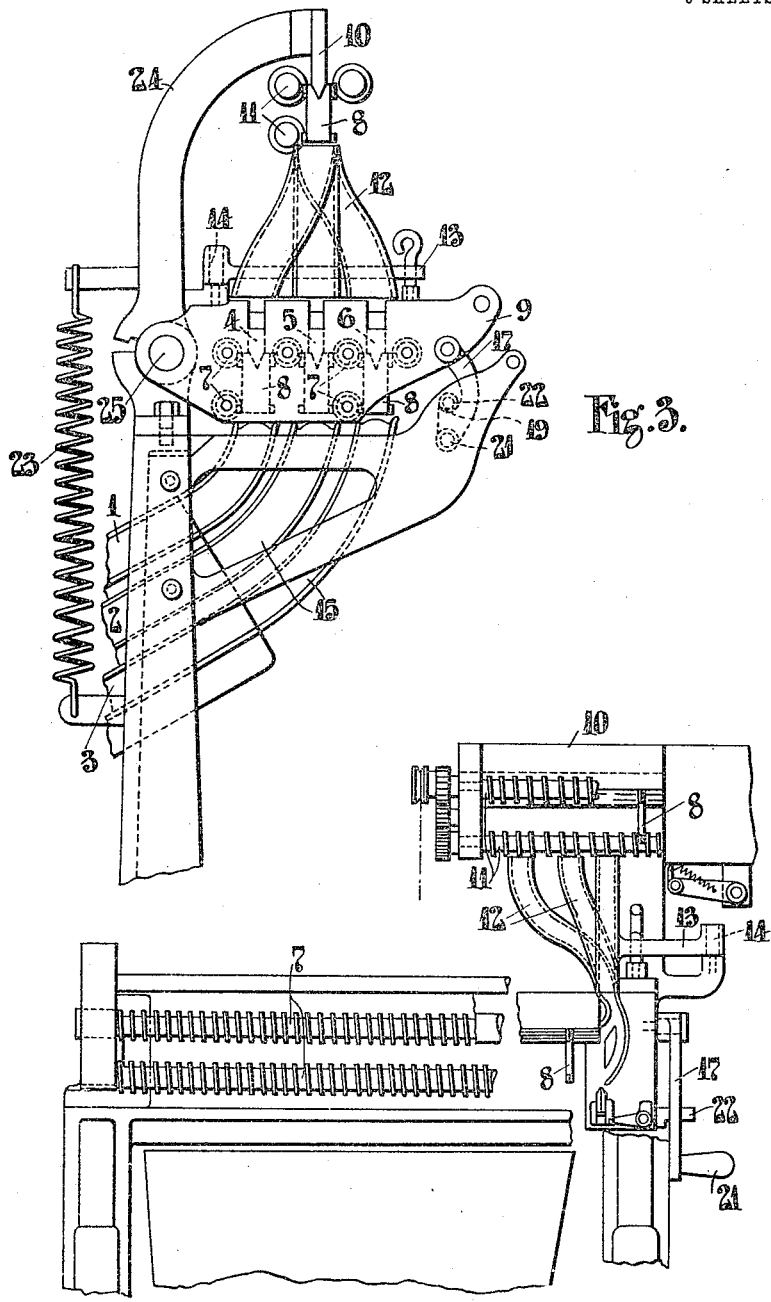

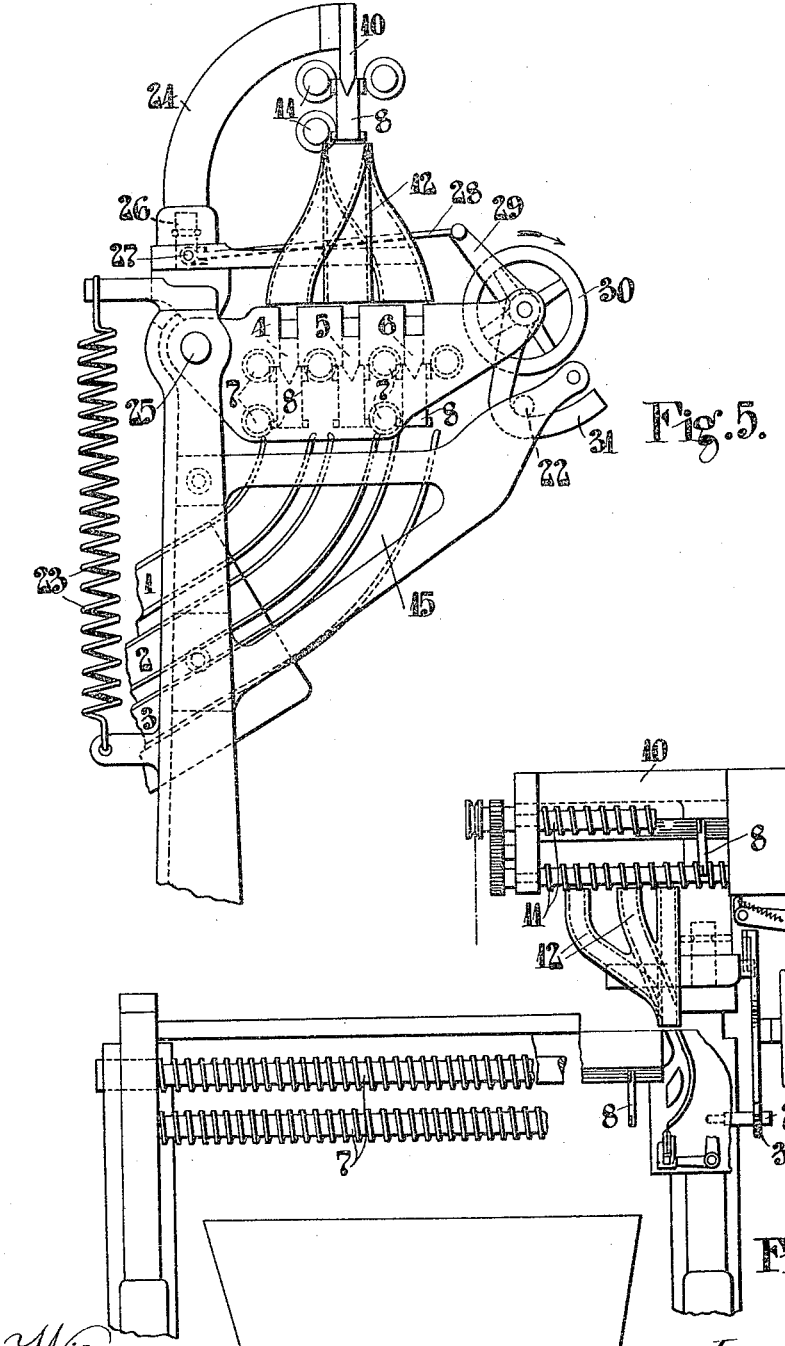

C. MUEHLEISEN.
TYPOGRAPHICAL COMPOSING MACHINE.
APPLICATION FILED MAY 16, 1914.

1,125,150.

Patented Jan. 19, 1915.
6 SHEETS—SHEET 4.

Witnesses
L. E. Morrison
M. R. Manning

Inventor
Carl Muehleisen
per Rogers, Kennedy & Campbell
Attorneys

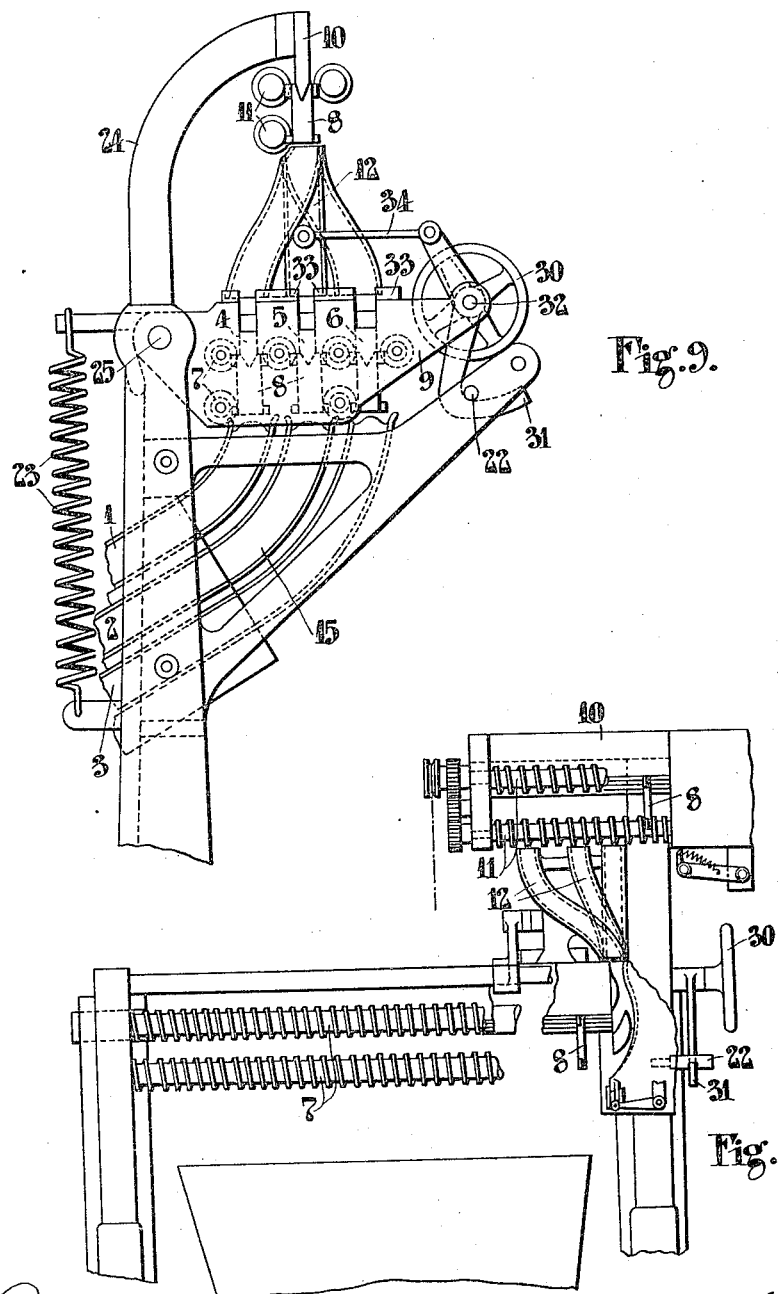

C. MUEHLEISEN.
TYPOGRAPHICAL COMPOSING MACHINE.
APPLICATION FILED MAY 16, 1914.

1,125,150.

Patented Jan. 19, 1915.
6 SHEETS—SHEET 6.

UNITED STATES PATENT OFFICE.

CARL MUEHLEISEN, OF BERLIN, GERMANY, ASSIGNOR TO MERGENTHALER LINOTYPE COMPANY, A CORPORATION OF NEW YORK.

TYPOGRAPHICAL COMPOSING-MACHINE.

1,125,150.   Specification of Letters Patent.   Patented Jan. 19, 1915.

Application filed May 16, 1914. Serial No. 838,935.

*To all whom it may concern:*

Be it known that I, CARL MUEHLEISEN, a citizen of the United States of America, residing at 23 Chausseestrasse, Berlin, N. 4, in the Empire of Germany, have invented new and useful Improvements in Typographical Composing-Machines, of which the following is a specification.

It is already known in typographical composing machines having a plurality of superposed magazines, to separate or distribute, in what is known as a font separator, matrices of the composed lines according to font and the particular magazine to receive them, this font separation being followed by the distribution of the matrices into their respective magazine channels according to character. Owing to the presence of the chutes connecting the font separator with the distributing mechanism, it has not hitherto been possible in these particular machines, in the manner already known in machines without such a separator, to move the entire distributing mechanism away from the magazines so as to give free access to the magazines or to the so-called magazine entrances located between the distributers and the magazines, without involving considerable trouble, such as dismantling the font separator. The present invention overcomes these difficulties by arranging the aforesaid chutes so that they, as a complete entity, can be moved independently of the distributer mechanism before the latter is rocked up, in such manner that these chutes cannot interfere with the movement of the distributers, and can, if so required move with the latter.

The drawings show diagrammatically six different constructional forms of the invention, each two successive figures being respectively a side elevation and a rear view of one of such constructional forms, certain parts being omitted from the rear views for the sake of clearness.

Throughout the several figures of the drawings like reference numerals are used for indicating like or corresponding parts.

In each of the constructional forms illustrated, there are represented three superposed magazines 1, 2, 3 and three distributer rails 4, 5, 6 but the invention can be applied to machines having more or less than that number. It is already known that each distributer rail requires three distributer screws 7 for propelling the matrices 8 along it. The distributer screws 7 and rails 4, 5, 6 are, in each of the constructional forms represented, mounted in common bearing plates 9, one at each end, but of which only one is shown in the drawings, see for example Fig. 1. The line to be distributed first enters the font separator 10 in which it is propelled forward by three screws 11 and the matrices there separated according to their various fonts fall through chutes 12 one for each such font which deliver them each to its respective distributer rail 4, 5 or 6, from which they subsequently drop each into the appropriate channel of the respective magazine 1, 2 or 3.

In order that the entire distributer mechanism may be moved away from the magazines or magazine entrances without obstruction by the chutes 12, these chutes in accordance with the present invention, are mounted in a common support or bracket 13 which is capable of being swung upon a vertical pivot 14, by which it is attached to the respective bearing plate 9, Fig. 1. The chutes 12 and support 13 are shown in full lines in the working position, and in dotted lines, as after the distributer mechanism has been moved away from the magazine entrances 15. For enabling the chutes 12 to be rocked on the pivot 14, their support 13 is connected to one end of a link 16 whose other end is pivoted to a lever 17 which is itself pivoted to the adjacent bearing plate 9 by a pivot pin 18. The lever 17 has a shoulder 19 and a hook or projection 20, and is capable of being moved by a handle 21. The shoulder 19 is capable of engaging with a stationary stud 22 for locking in the working position, the distributer mechanism in opposition to the influence of a spring 23, which constantly tends to rock the said mechanism or retain it in the raised or inoperative position in which it is shown in dotted lines. When it is desired to move the distributer mechanism away from the magazine entrances 15, it is only necessary to disengage the shoulder 19 of the lever 17 from the stud 22, and during the movement of the lever 17 for effecting this disengagement, the chutes 12 are swung from beneath the font separator 10. As soon as the shoulder 19 is disengaged from the stud 22, the spring 23 raises the supporting plates 9 together with the distributer rails 4, 5, 6 and screws 7 about the pivot 25 away from the upper ends of the magazine entrances 15, this movement continuing until the hook 20 engages the stud 22 which thus serves to limit the stroke.

In the constructional form represented in Figs. 3 and 4, the standards 24 which support the font separator 10, the chutes 12 and the distributing mechanism can all be rocked manually or otherwise as a single entity about a common stud 25 mounted on the machine frame. It is therefore not necessary in this arrangement to move the chutes 12 independently of the font separator 10 or distributing mechanism before raising the latter. To retain the distributing mechanism in working position in opposition to the tendency of the spring 23, to move it out of such position, a latch 17 provided with a handle 21 is engaged with a stud 22. In other respects the arrangement now under review operates in the same manner as that previously described with reference to Figs. 1 and 2. The chutes 12 may, however, also be made to rock independently of the distributing mechanism, in a similar manner to that previously described in connection with Figs. 1 and 2, and for that purpose would be arranged on a common support 13 capable of turning about a vertical pivot or stud 14.

In the constructional form shown in Figs. 5 and 6, the standard 24 carrying the font separator 10, as well as the chutes 12 is capable of being swung on the machine frame about a vertical pivot or stud 26. The distributing mechanism as a whole, swings, as in the before described examples, about a pivot 25. The standard 24 has on one side a stud or arm 27 in pivotal connection with one end of a link 28 whose other end is pivoted to a lever arm 29 moved angularly by a hand wheel 30 and having a hook or arm 31 engaging a fixed locking stud 22. In order to rock the distributer mechanism upward from the magazine entrances 15 it is merely necessary to turn the hand wheel 30 in the direction indicated by the arrow in Fig. 5. During the movement of the hook 31 beneath the stud 22, a turning sidewise of the bracket 24 takes place through the medium of the link 28, and, as soon as the hook 31 leaves the stud 22, the entire distributer mechanism is rocked up under the influence of the spring 23.

Figure 8:
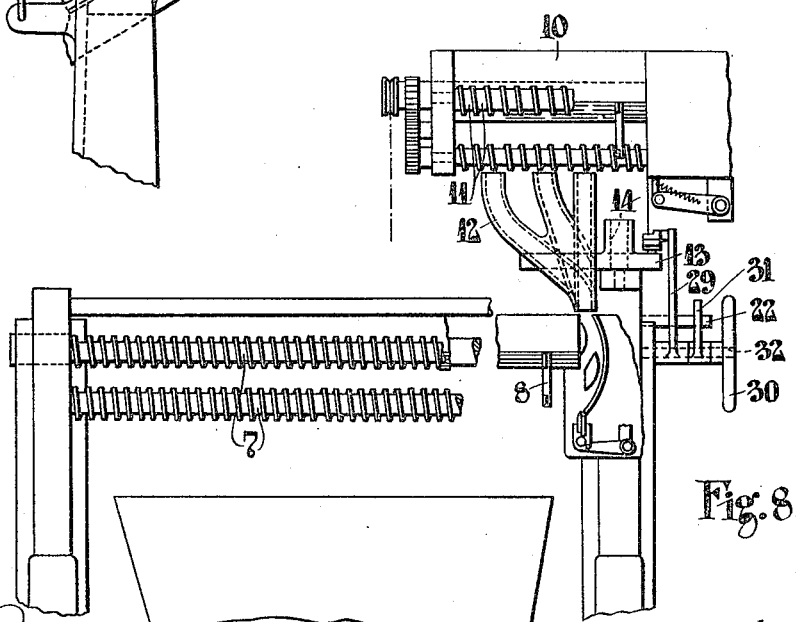

The constructional form shown in Figs. 7 and 8 substantially corresponds with that herein first described, the material differences residing in the fact that the pivot 14 of the support 13 which carries the chutes 12, is not arranged on the bearing plates 9 of the distributer devices, but on the bracket or standard 24, so that when the distributer mechanism is rocked up, the chutes 12 retain their vertical position instead of assuming an inclined position as in Fig. 1. As, in this case, the chutes 12 remain in connection with the frame of the machine, the device for operating the link 28 must necessarily also be arranged on the machine frame. Therefore a shaft 32 is provided upon which are secured a handwheel 30, lever arm 29 and hook-shaped locking arm 31, the last named engaging with a stud 22 on the bearing plate 9. By turning the handwheel 30, the chutes 12 are first of all moved from above the distributing mechanism, whereupon the locking arm 31 releases the stud 22 and the distributing mechanism is thereupon swung upward by the spring 23.

The constructional form shown in Figs. 9 and 10 substantially corresponds with the one shown in Figs. 5 and 6, from which, however, it differs in respect of the fact that the chutes 12 are not rocked sidewise together with the bracket 24 but are moved in a straight line. To this end the feet of the chutes 12 are movable in guides 33 extending fore and aft of the machine, and the said chutes are moved in these guides by means of a link 34, whenever the hand wheel 30 is turned. After the chutes 12 have been displaced rectilinearly, the locking arm 31 which is fast to the shaft 32 moves clear of the stud 22, and the distributing mechanism together with its bearing plates 9 is capable of being rocked by the spring 23 out of working position.

Figure 11:
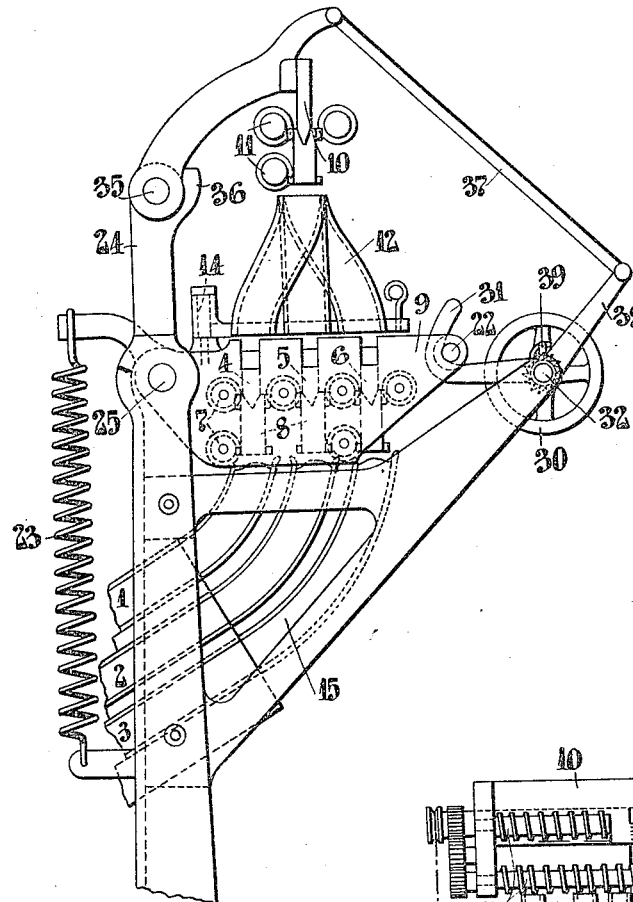
Figure 12:
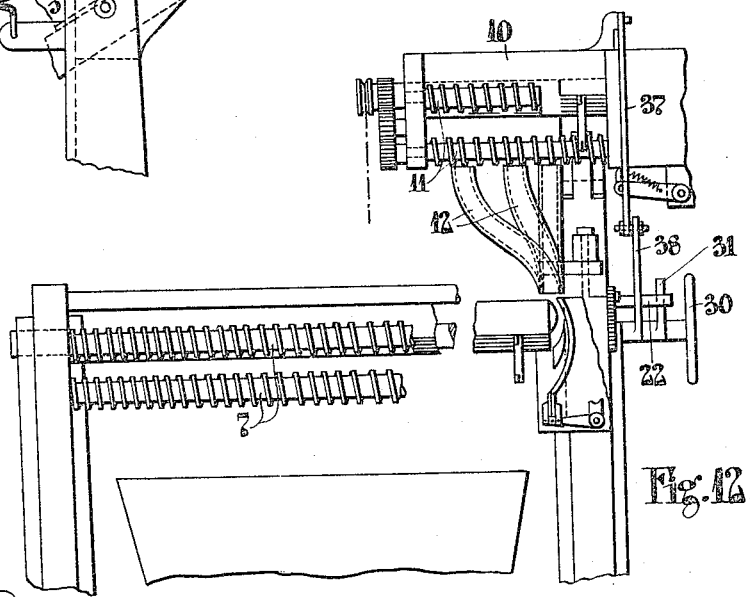

Finally in the constructional form shown in Figs. 11 and 12, the font separator 10 together with the traversing screws 11 appertaining thereto, is rocked about a pivot 35 in the machine frame before the distributing mechanism is released. Space is thereby afforded to enable the chutes 12 to swing up together with the distributing mechanism. For this purpose the hinge or pivot 35 is arranged in the bearing bracket 24 of the font separator, which bracket is provided with a stop 36 limiting the downward movement of the font separator. By means of a link 37 connected to an arm 38 on the shaft 32 of the hand wheel 30, the upper part of the supporting bracket 24 is raised, while the locking arm 31 on the shaft 32 is still in engagement with the locking stud 22 on the bearing frame 9 of the distributing mechanism. When the font separator 10 has been rocked sufficiently high, the locking arm 31 leaves the locking stud 22, and the distributing mechanism under the action of the spring 23 is raised to its uppermost position. In this case also the chutes 12 may be arranged to turn about a vertical pivot 14 in order to admit of their removal from over the distributing mechanism. In order to prevent the font separator 10 from falling back, a ratchet or equivalent locking device 39 may be provided on or in connection with the shaft 32.

Having described my invention, I declare that what I claim and desire to secure by Letters Patent is:—

1. In a typographical composing machine, the combination with a plurality of distributers, a font separator, and a plurality of chutes adapted to conduct the matrices separated by the font separator to the respective distributers, of means operative to move the plurality of chutes as a single entity into and out of coöperative register with the font separator and the distributers.

2. In a typographical composing machine, the combination with a plurality of distributers, a font separator, and a plurality of chutes to conduct the matrices separated by the font separator, to the respective distributers, of means operative to move one of the last mentioned elements horizontally into and out of coöperative relation with the distributers.

3. In a typographical composing machine, the combination with a plurality of magazines, a corresponding plurality of matrix distributers, a font separator, and a corresponding plurality of chutes each adapted to conduct matrices from the font separator to the respective matrix distributer, of means adapted to move the matrix distributers simultaneously out of coöperative register with the magazines and means adapted to move the chutes independently of the matrix distributers into and out of coöperative register with the font separator.

4. In a typographical composing machine, the combination with a plurality of magazines, a corresponding plurality of matrix distributers, a font separator, and a corresponding plurality of chutes each adapted to conduct matrices from the font separator to the respective matrix distributer, of a vertical pivot for the chutes about which the latter can swing as a single entity, in a horizontal plane.

5. In a typographical composing machine, the combination with a plurality of magazines, a corresponding plurality of matrix distributers, a font separator, and a corresponding plurality of chutes each adapted to conduct matrices from the font separator to the respective matrix distributer, of means adapted to move the matrix distributers simultaneously out of coöperative register with the magazines, a spring adapted to so move the matrix distributers, a movable catch normally preventing the said movement, a vertical pivot about which the chutes can swing as a single entity independently of the distributers, and a link connecting the catch with the chutes so that as the said catch is released, the chutes are swung on their pivot.

6. In a typographical composing machine, the combination with a plurality of magazines, a corresponding plurality of matrix distributers, of means adapted to move the matrix distributers simultaneously out of coöperative register with the magazines, a spring operative to effect such simultaneous movement of the matrix distributers, a movable catch normally preventing the said movement, and a hook on the catch operative to limit that movement.

7. In a typographical composing machine, the combination with a plurality of magazines, a corresponding plurality of matrix distributers, a font separator, and a corresponding plurality of chutes each adapted to conduct matrices from the font separator to the respective matrix distributer, of means adapted to move the chutes simultaneously out of and into coöperative register with the matrix distributers.

8. In a typographical composing machine, the combination of a plurality of magazines, a corresponding plurality of matrix distributers, a horizontal pivot about which the matrix distributers can swing independently of the magazines, a font separator, a plurality of chutes each adapted to conduct matrices from the font separator to the respective matrix distributer and a vertical pivot fast to the matrix distributer about which the chutes can as a complete entity, be swung into and out of operative relation to the font separator.

9. In a typographical composing machine, the combination of a plurality of magazines, a corresponding plurality of matrix distributers, a horizontal pivot about which the matrix distributers can swing independently of the magazines, a font separator, a plurality of chutes each adapted to conduct matrices from the font separator to the respective matrix distributer, and a vertical pivot about which the chutes can, as a complete entity, be swung into and out of operative relation to the matrix distributers.

10. In a typographical composing machine, the combination of a plurality of magazines, a corresponding plurality of matrix distributers, a horizontal pivot about which the matrix distributers can swing independently of the magazines, a font separator, a plurality of chutes each adapted to conduct matrices from the font separator to the respective matrix distributer, a vertical pivot about which the chutes, can, as a complete entity, be swung independently of the matrix distributers, a spring adapted to raise the matrix distributers out of coöperating register with the magazines, a latch locking the matrix distributers against the action of the spring, and common means for swinging the chutes about the vertical pivot and releasing and engaging the latch.

11. In a typographical machine, the combination with a plurality of distributers movable upwardly as a whole from their operative position, a font separating mechanism located above the distributers, and a plurality of tubes or chutes leading in opposite directions from the font separating mechanism to the several distributers, at least one of the two last mentioned elements being movable at will from its operative position to permit the upward movement of the distributers.

12. In a typographical machine, the combination of a plurality of distributers movable upwardly as a whole from their operative position, locking devices to hold the distributers in their operative position, a font separating mechanism located above the distributers, a plurality of tubes or chutes leading from the font separating mechanism to the several distributers, and means for moving one of the two last mentioned elements from its operative position and simultaneously releasing the locking devices for the distributers.

13. In a typographical machine, the combination of a plurality of distributers movable upwardly as a whole from their operative position, locking devices to hold the distributers in their operative position, a font separating mechanism located above the distributers, a plurality of tubes or chutes leading from the font separating mechanism to the several distributers, one of the two last mentioned elements being movable at will from its operative position, and automatic means controlled by such movement for releasing the distributers.

14. In a typographical machine, the combination of a plurality of distributers movable upwardly as a whole from their operative position, a font separating mechanism located above the distributers, a plurality of tubes or chutes leading from the font separating mechanism to the several distributers, one of the two last mentioned elements being movable at will from its operative position, and means for preventing the upward movement of the distributers until the aforesaid element has been moved from its operative position.

15. In a typographical machine, the combination with a plurality of distributers movable at will from their operative position, of a font separator, and a plurality of tubes or chutes leading in opposite directions from the font separator to the respective distributers, the said parts being arranged so that at least one of the two last mentioned elements may be moved from its operative position to permit the movement of the distributers.

16. In a typographical machine, the combination with a plurality of matrix distributers movable at will from their operative position, of a font separator, and a plurality of chutes leading therefrom to the respective distributers, one of said elements being movable out of operative relation to the other preparatory to the movement of the distributers.

17. In a typographical machine, the combination of a plurality of matrix distributers movable at will from their operative position, a font separator, and a plurality of chutes leading therefrom to the respective distributers, the said chutes being movable out of operative relation to the font separator preparatory to the movement of the distributers.

18. In a typographical machine, the combination with a plurality of distributers, movable at will from their operative position, of a font separator, and a plurality of tubes or chutes leading therefrom to the respective distributers, one of the said elements being movable at will out of operative relation to the distributers to permit their movement.

In witness whereof I have hereunto set my hand in the presence of two witnesses.

CARL MUEHLEISEN.

Witnesses:
 WOLDEMAR HAUPT,
 HENRY HASPER.

Copies of this patent may be obtained for five cents each, by addressing the "Commissioner of Patents Washington, D. C."